United States Patent [19] [11] Patent Number: 6,010,440
Miyano [45] Date of Patent: Jan. 4, 2000

[54] AUTOMATED MACHINE TOOL INCLUDING A PLURALITY OF PROCESSING UNITS AND A SHARED TOOL STOCKER

[76] Inventor: Toshiharu Tom Miyano, 50 Dundee La., Barrington Hills, Ill. 60010

[21] Appl. No.: 08/922,852

[22] Filed: Sep. 3, 1997

[51] Int. Cl.[7] .................................................. B23Q 3/155
[52] U.S. Cl. ........................ 483/1; 29/335; 29/39; 483/3; 483/15; 483/24; 483/37; 483/40; 483/51; 483/63
[58] Field of Search ................................... 483/1, 33, 14, 483/15, 22, 23, 24, 32, 36, 37, 38, 40, 48, 51, 52, 63; 29/35.5, 36, 39, 335

[56] References Cited

U.S. PATENT DOCUMENTS

| | | | |
|---|---|---|---|
| 3,490,318 | 1/1970 | Jones | 29/35.5 |
| 4,622,734 | 11/1986 | Kolblin et al. | 483/37 |
| 4,654,954 | 4/1987 | Bayes et al. | 483/40 |
| 4,711,016 | 12/1987 | Genschow et al. | 483/37 |
| 4,742,609 | 5/1988 | Neumann | 483/3 |
| 4,831,714 | 5/1989 | Babel et al. | 483/3 |
| 5,181,898 | 1/1993 | Piotrowski | 483/3 |
| 5,379,509 | 1/1995 | Mills et al. | 483/1 |
| 5,486,151 | 1/1996 | Bergmann et al. | 483/1 |
| 5,669,751 | 9/1997 | Hoffman et al. | 483/3 |

FOREIGN PATENT DOCUMENTS

| | | | |
|---|---|---|---|
| 032890 | 7/1981 | European Pat. Off. | 483/36 |
| 208125 | 1/1987 | European Pat. Off. | 483/32 |
| 238755 | 9/1986 | Germany | 483/22 |
| 56-45349 | 4/1981 | Japan | 483/22 |

*Primary Examiner*—Andrea L. Pitts
*Assistant Examiner*—Christopher Kirkman
*Attorney, Agent, or Firm*—Wood, Phillips, VanSanten, Clark & Mortimer

[57] ABSTRACT

An automated machine tool is provided and includes a frame having a first workpiece transfer station at a first location on the frame; at least two self-contained processing units, each of the units including structure for holding the workpiece for processing and structure for performing a process on the workpiece; structure for sequentially indexing the processing units to the first workpiece transfer station for transferring workpieces to and from each of the processing units; a shared tool storing device; a first cutting tool transfer device for transferring cutting tools to and from the processing units; and a second cutting tool transfer device for transferring cutting tools between the first transfer device and the storing device.

16 Claims, 7 Drawing Sheets

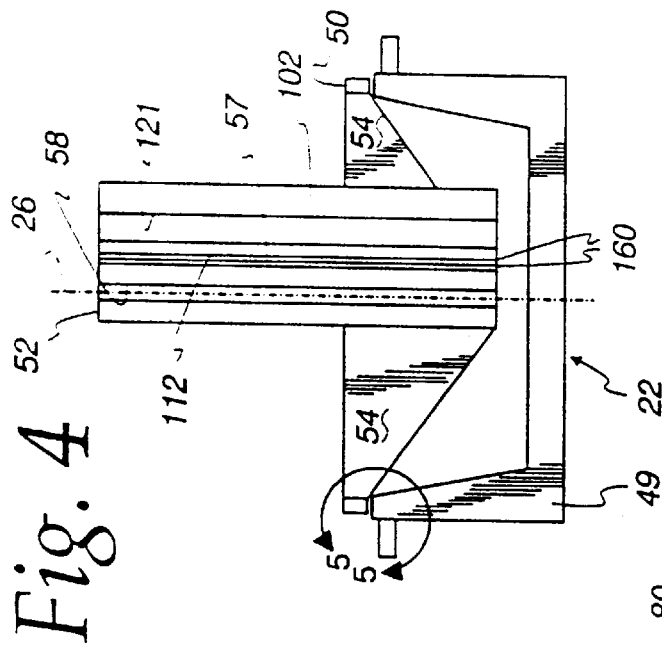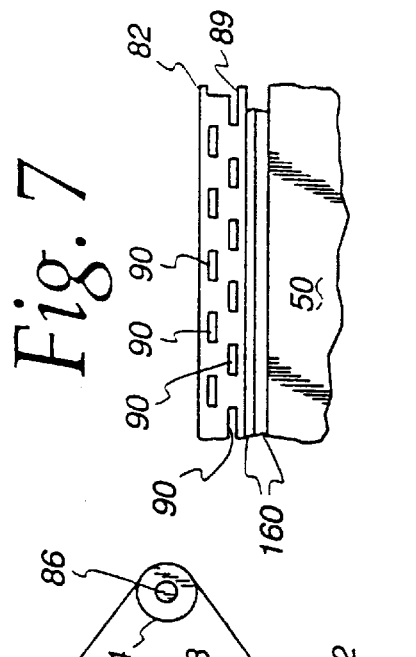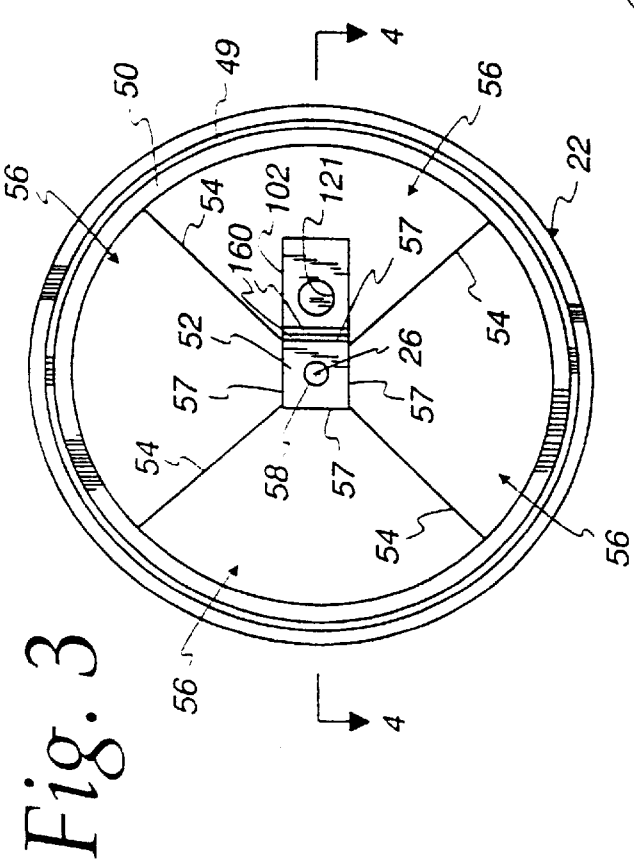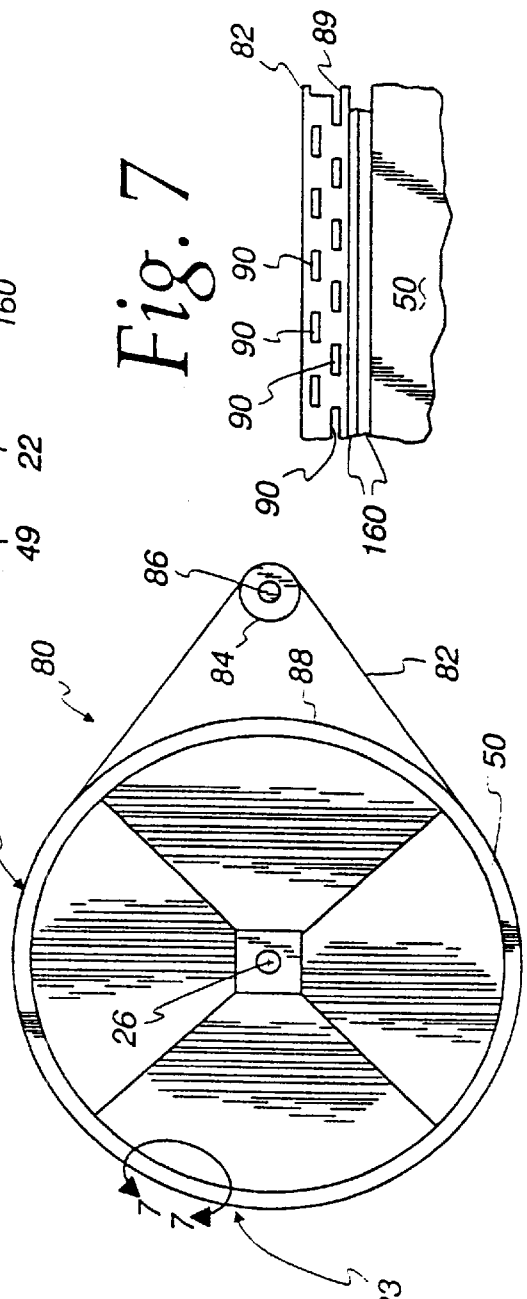

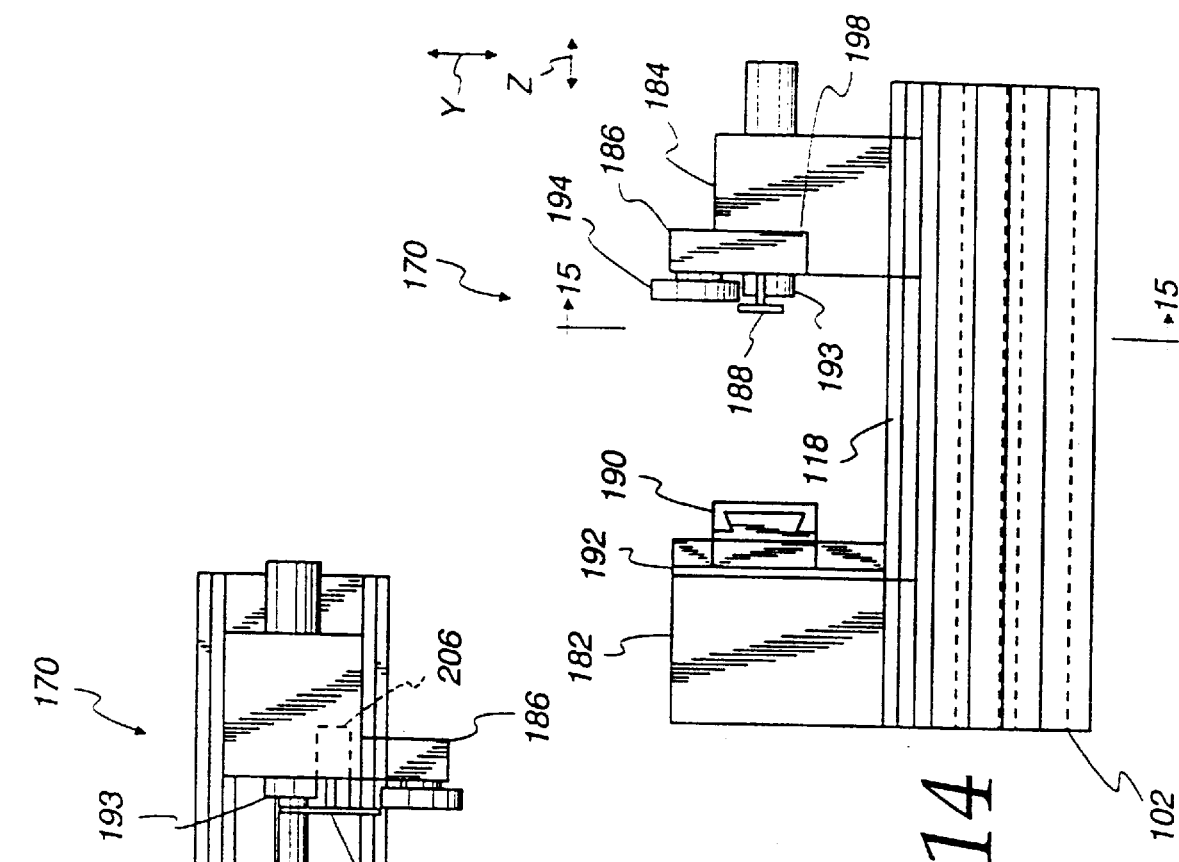
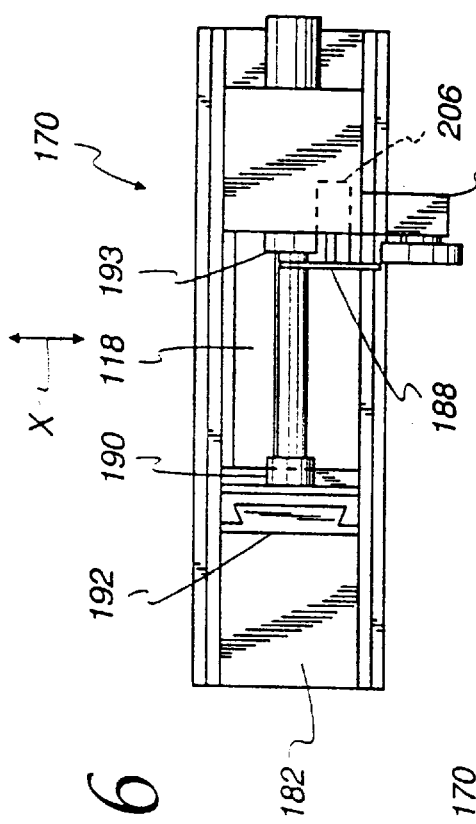
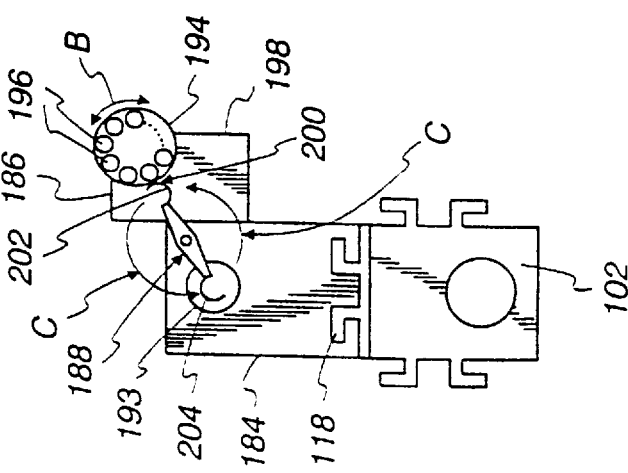
Fig. 14
Fig. 15
Fig. 16

AUTOMATED MACHINE TOOL INCLUDING A PLURALITY OF PROCESSING UNITS AND A SHARED TOOL STOCKER

FIELD OF THE INVENTION

This invention relates to machine tools and, more particularly, to automated machine tools.

BACKGROUND OF THE INVENTION

Automated transfer machines for performing a plurality of processing functions on a workpiece are well known. Typically, such machines include a plurality of self-contained processing units or machine tools organized in a fixed array on a shop floor. It is common for a self-contained processing unit to include a dedicated cutting tool storage device for storing a plurality of cutting tools and a cutting tool transfer device for transferring cutting tools in and out of the storage device for use in the processing unit. Workpiece transfer devices shuttle workpieces in a predetermined sequence from processing unit to processing unit so that each processing unit performs its processing function on the workpieces, thereby resulting in a finished workpiece. The control of the workpiece transfer units and the processing units is integrated.

While such transfer machines have proven successful in providing a relatively high workpiece production rate, they tend to require a relatively large amount of floor space because each processing unit has a dedicated base and a dedicated location on the shop floor.

Additionally, the workpiece transfer devices can become quite complex and expensive depending upon the overall size of the transfer machine and the size and shape of the workpiece.

Further, each processing unit may include a dedicated cutting tool storage device, thereby taking up an even greater amount of floor space and shop volume. Typically, when the transfer machine must be retooled, the processing units must be shut down and the cutting tools for each of the processing units must be transported to each of the dedicated processing units and loaded into each of the dedicated cutting tool storage devices.

SUMMARY OF THE INVENTION

In accordance with the present invention, a system for machining workpieces is provided and includes a first workpiece processing unit, a second workpiece processing unit, a shared storing device for storing a plurality of cutting tools to be used in the first and second processing units, and a first transfer device for selectively transferring cutting tools between the storing device and each of the first and second processing units.

In one form of the invention, the shared storing device includes a matrix of storage positions, each storage position being adapted to store a cutting tool. The first transfer device includes a robot arm adapted to selectively transfer cutting tools to and from each of the storage positions.

In one form of the invention, the first transfer device includes a second transfer device for transferring cutting tools to and from the first and second processing units, and a third transfer device for transferring cutting tools between the storing device and second transfer device.

In one form, the machining system further includes a frame. The second transfer device includes a carriage mounted on the frame for movement between a first location on the frame to effect transfer of cutting tools to and from the first processing unit and a second location on the frame to effect transfer of cutting tools to and from the second processing unit. The first location is spaced from the second location.

In one form of the invention, the first and second locations are spaced circumferentially about an axis, the first and second processing units are mounted on the frame for rotation about the axis between the first and second locations, and the carriage includes a ring-shaped carrier mounted on the front for rotation about an axis.

In one form of the invention, the first workpiece processing unit includes a tool spindle, a dedicated storing device for storing a plurality of cutting tools to be used in the first processing unit, and a dedicated transfer device for transferring cutting tools between the tool spindle and the second storing device.

In one form of the invention, the dedicated storing device includes a matrix of storage positions and structure for indexing the matrix relative to a tool transfer location on the first workpiece processing unit. Each of the storage positions in the matrix is adapted to store a cutting tool. The dedicated transfer device includes a first tool carrier for carrying a tool between the tool spindle and the matrix, a second tool carrier for carrying a tool between the tool spindle and the matrix, and a drive for sequentially indexing the first and second tool carriers relative to the tool spindle and the tool transfer location.

In accordance with one aspect of the invention, a system for machine workpieces is provided and includes a frame, a first tool spindle mounted on the frame, a first storing device for storing a plurality of cutting tools to be used in the first tool spindle, a second storing device for storing a plurality of cutting tools to be used in the first tool spindle, a first transfer device for transferring cutting tools between the second storing structure and the first storage device, and a second transfer device for transferring cutting tools between the first tool spindle and the second storing structure.

In one form, the system further includes a second tool spindle mounted on the frame, a third storing device for storing a plurality of cutting tools to be used in the second tool spindle, and a third transfer device for transferring cutting tools between the second tool spindle and the third storing device. The first storing device includes structure for storing a plurality of cutting tools to be used in the second tool spindle. The first transfer device includes structure for transferring cutting tools between the third storing device and the first storing device.

In accordance with one aspect of the invention, a method of tooling an automated machining system is provided. The method includes the steps of providing a first processing unit, providing a second processing unit, providing a shared storing device for storing a plurality of tools to be used from the first and second processing units, providing a first transfer device for transferring tools to and from the first and second processing units, providing a second transfer device for transferring tools between the storage device and the first transfer device, transferring a first tool from the shared storage device to the first transfer device using the second transfer device, transferring the first tool to one of the first and second processing units using the first transfer device, and transferring a second tool from the shared storage device using the second transfer device. The steps of transferring the first tool to one of the first and second processing units and transferring a second tool from the storage device are performed substantially simultaneously.

In one form, the step of transferring the first tool to one of the first and second processing units includes the step of repositioning the first transfer device relative to one of the first and second processing units.

In accordance with one aspect of the present invention, a method of tooling an automated machining system is provided. The method includes the steps of providing a tool spindle, providing a first storage device for storing a plurality of tools to be used in the tool spindle, providing a first transfer device for transferring tools between the tool spindle and the first storage device, providing a second tool storage device for storing a plurality of tools to be used in the tool spindle, providing a second transfer device for transferring tools between the second storage device and the first storage device, transferring a first cutting tool between the tool spindle and the first storage device using the first transfer device, and transferring a second cutting tool between the second storage device and the first storage device using the second transfer device. The transferring steps are performed substantially simultaneously.

BRIEF DESCRIPTION OF THE DRAWINGS

FIG. 3 is a diagrammatic plan view showing a base, a rotatable carrier, and a processing unit platform of the machining system shown in FIG. 1;

FIG. 4 is a cross-sectional view of the base, the carrier, and the processing unit platform taken along line 4—4 in FIG. 3;

FIG. 6 is a diagrammatic plan view showing a carrier and drive assembly of the machining system tool shown in FIG. 1;

FIG. 7 is an enlarged roll-out view of the area indicated by line 7—7 in FIG. 6;

FIG. 14 is a side elevation view of a machining center for use in the machining system shown in FIG. 12;

FIG. 15 is a sectional view taken along line 15—15 shown in FIG. 14; and

FIG. 16 is a plan view of the unit shown in FIG. 14.

DETAILED DESCRIPTION OF THE PREFERRED EMBODIMENTS

Figure 1:
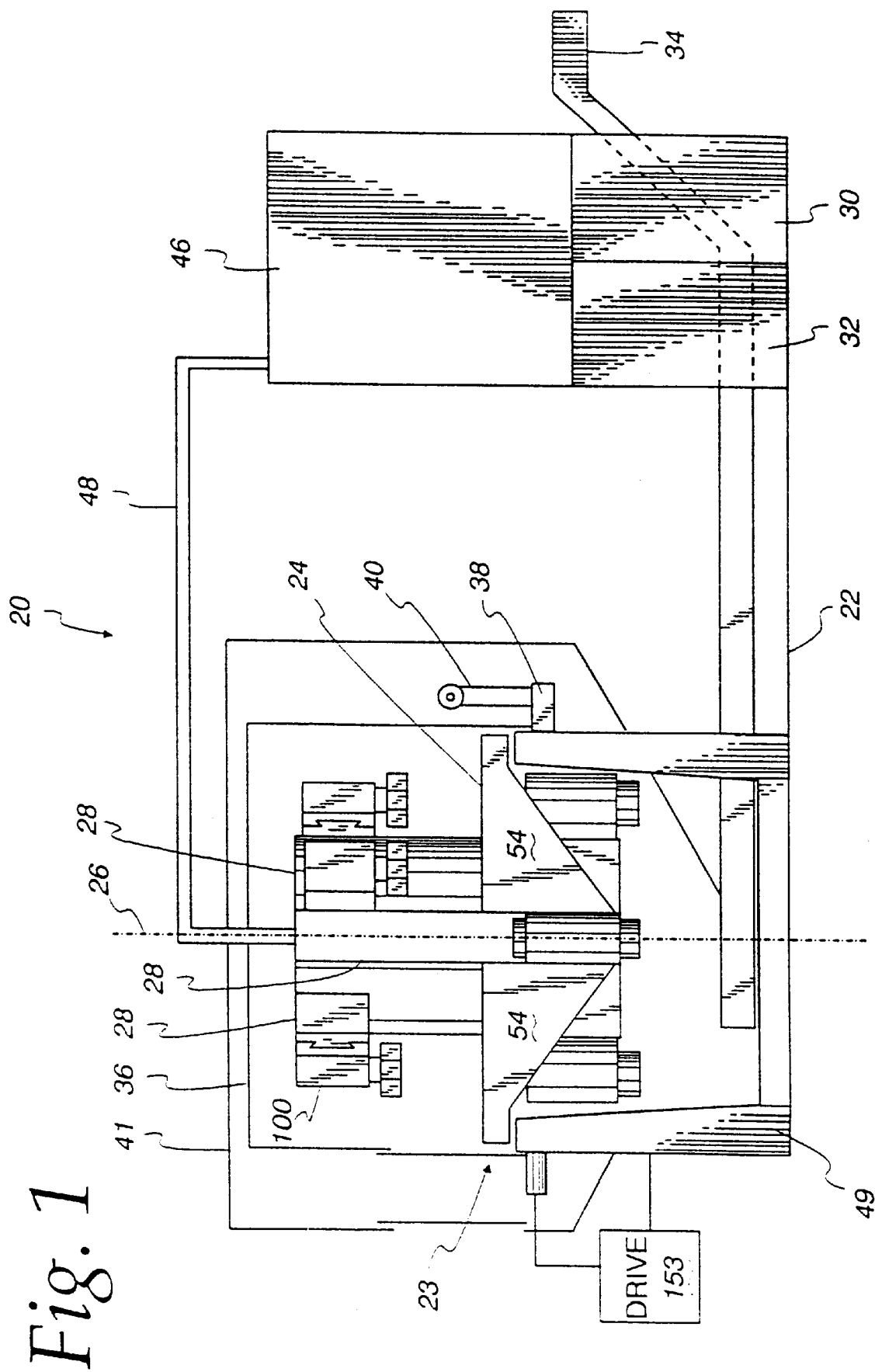
FIG. 1 is a diagrammatic elevation view shown partially in section of a machining system embodying the present invention.
Figure 2:
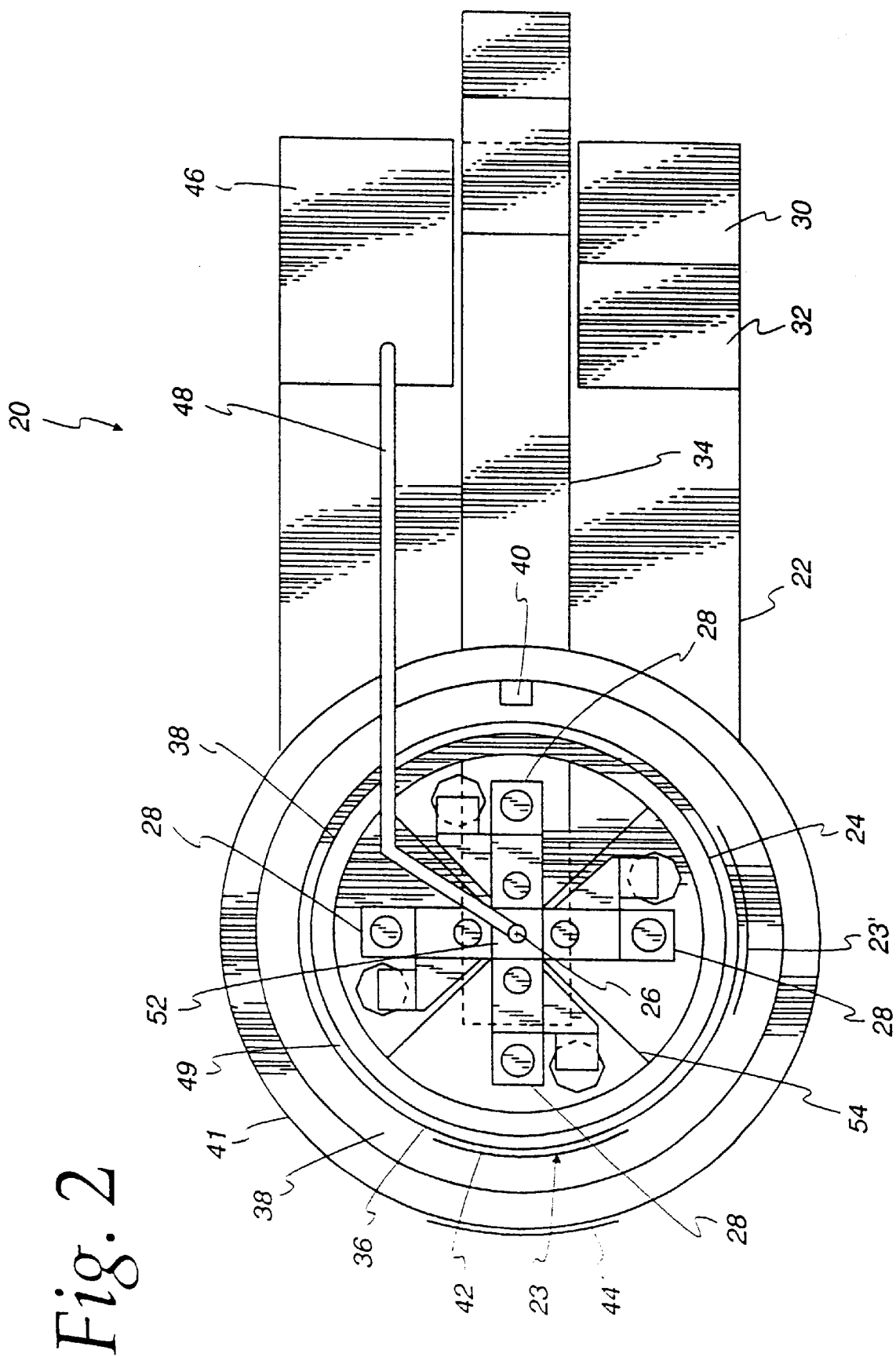
FIG. 2 is a diagrammatic plan view of the machining system shown in FIG. 1.

FIGS. 1 and 2 show a diagrammatic illustration of an automated machining system or machine tool 20 embodying the present invention. The machine tool 20 includes a frame 22 having a workpiece transfer station 23 at a fixed location on the frame 22, a carrier 24 mounted on the frame for rotation about a vertical axis 26, and four self-contained machine tools or processing units 28 that are fixed to the carrier 24 at 90° intervals about the axis 26. The processing units 28 are mounted on the carrier 24 for rotation about the axis 26 so that each of the processing units 28 can be sequentially indexed to the workpiece transfer station 23 for transferring workpieces to and from each of the processing units 28.

The machine tool 20 further includes a coolant unit 30 for supplying cooling and cutting fluid to the processing units 28; a power supply unit 32 for supplying electric and hydraulic power to any of the components of the machine tool 20 that require electric or hydraulic power, including any of the processing units 28; a chip conveyor unit 34 for removing chips and other machining debris from the machine tool 20; a cylindrical splash guard 36 that surrounds the upper portions of the processing units 28 to form a cylindrical machining chamber; an annular-shaped carriage or carrier 38 that is mounted to the frame 22 for rotation about the axis 26; a robotic workpiece/cutting tool transfer device 40 that is fixed to the carrier 38 for rotation therewith about the axis 26; a cylindrical-shaped safety guard 41 mounted to the frame 22 surrounding the carrier 38 and the workpiece/cutting tool transfer device 40; automated opening and closing doors 42 and 44 located at the workpiece transfer station 23 to allow access to the interiors of the splash guard 36 and the safety guard 41, respectively; an integrated control unit 46 for controlling the components of the machine tool 20, including the carrier 24, the processing units 28, the cooling unit 30, the power supply 32, the chip-conveyor unit 34, the carrier 38, the workpiece transfer device 40, and the automatic doors 42,44; and a multiple conduit line 48 for transferring cutting fluid, coolant, control signals, and electric and hydraulic power between the processing units 28 and the control unit 46, the cooling unit 30 and the power supply 32.

The cooling unit 30, the power supply 32, the chip conveyor unit 34, the splash guard 36, the transfer device 40, the safety guard 41, the automatic doors 42,44, the conduit line 48, and the integrated control unit 46 are either conventional or are constructed utilizing conventional components and, accordingly, need not be described in further detail for an understanding of the invention.

As best seen in FIGS. 3 and 4, the frame 22 includes a bowl-shaped base 49 mounting the carrier 24. The carrier 24 consists of a rigid, annular outer rim 50; a vertically-extending center mast or post 52; and four ribs 54 rigidly connecting the post 52 to the rim 50. Together, the rim 50, the post 52 and the ribs 54 define four open processing areas 56 having adequate clearance to mount the processing units 28 and to allow free movement of the various components of the processing units 28 and of any workpieces carried by the processing units 28. The post 52 includes four longitudinally-extending mount surfaces 57, each of which is adapted to mount one of the processing units 28. The post 52 also includes a longitudinally-extending opening 58 to allow cutting fluid, coolant, control signals, and hydraulic and electric power to be transferred between the conduit line 46 and the processing units 28 mounted on the post 52. Conventional, rotatable couplings are provided between the conduit line 56 and the post 52 for the transfer of each of the cutting fluid, the coolant, the control signals, the hydraulic power, and the electric power. Connections are provided between the processing units 28 and the post 52 for transferring cutting fluid, coolant, control signals, and electric and hydraulic power as required for the particular type of processing unit 28. These connections may be provided at the interface between the surface 57 and the processing unit 28.

Figure 5:
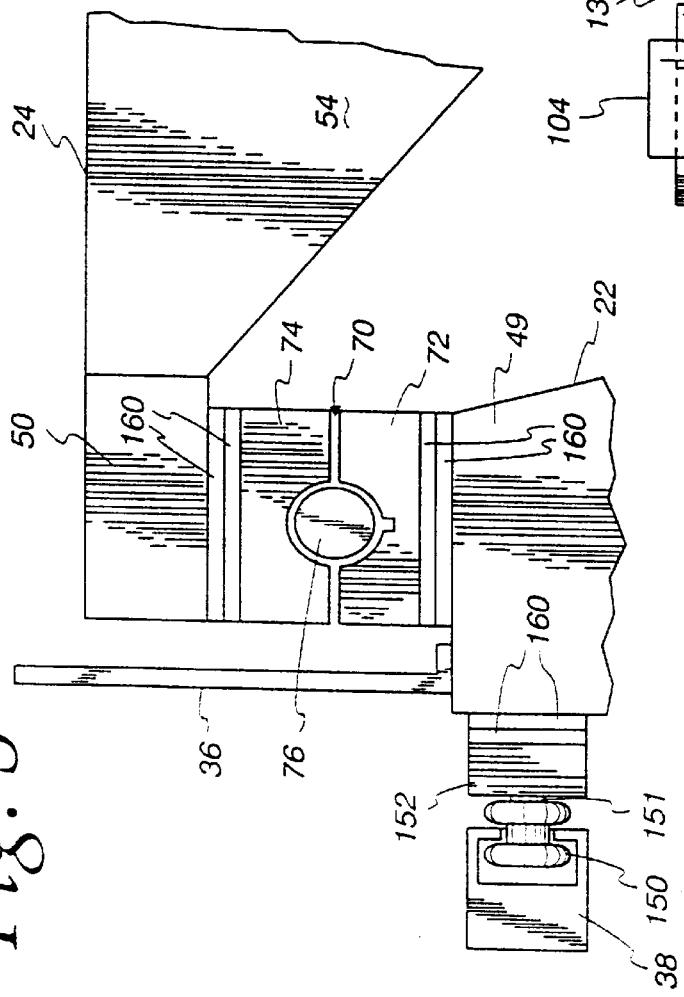
FIG. 5 is an enlarged diagrammatic view of the area encircled by line 5—5 in FIG. 4.

As best seen in FIG. 5, the carrier 24 is mounted for rotation on the base 49 by an axial, deep-groove ball bearing 70 having a lower annular race 72 fixed to the base 49, an upper annular race 74 fixed to the rim 50, and a plurality of balls 76 separating the races 72 and 74, as is conventional. The bearing 70 employs conventional technology. Accordingly, a more detailed description of the bearing 70 is unnecessary for an understanding of the invention. Further, it will be appreciated that any conventional bearing construction capable of carrying the described axial loads could be employed in the invention to rotatably mount the carrier 24 to the base 49.

Figure 10:
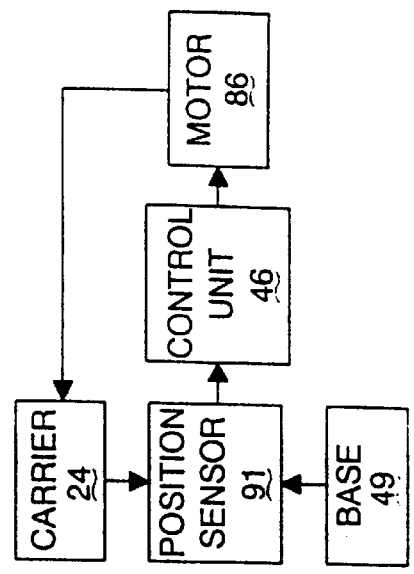
FIG. 10 is a schematic representation of a rotational indexing drive of the machining system shown in FIG. 1.

As best seen in FIG. 6, a rotational drive assembly, shown generally at 80, is provided for rotationally-driving the carrier 24 and the processing units 28 mounted thereon about the axis 26 and for sequentially indexing the processing units 28 to the workpiece transfer station 23. The drive assembly 80 includes an endless, toothed drive belt 82, a drive sprocket 84 for driving the belt 82, a servo motor 86 for driving the drive sprocket 84 and the belt 82, and a driven sprocket 88 mounted on the outer circumference of the rim 50 and drivably engaged with the belt 82. As best seen in FIG. 7, the driven sprocket 88 is formed from a toothed belt 89, similar to the belt 82, that has been wrapped around the outer circumference of the rim 50 and attached thereto by a suitable adhesive, thereby saving the cost of forming sprocket teeth on the outer circumference of the rim 50. The timing between the carrier 24 and the motor 86 is maintained by the meshed teeth 90 of the belt 82 and the sprockets 84,88. As shown schematically in FIG. 10, a conventional position sensor 91 is provided between the carrier 24 and the base 49 to provide a signal to the control unit 46 indicative of the rotational position of the carrier 24 relative to the base 49 and the workpiece transfer station 23. The control unit 46 utilizes the signal to control the motor 86 so that the processing units 28 are accurately indexed relative to the workpiece transfer station 23.

It should be appreciated that the details of the drive assembly 80 are shown for illustrative purposes only and that any form of conventional rotational drive and positional control system may be used to rotate and index the carrier 24 and the processing units 28. Thus, for example, the drive motor 86 could be operably engaged with the carrier 24 by a gear transmission that drives either a ring gear mounted on the rim 50 or a spur gear rotationally fixed to the post 52.

Figure 9:
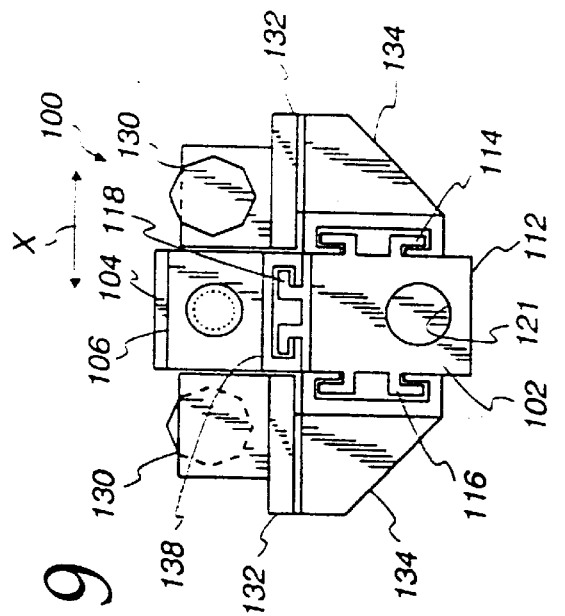
FIG. 9 is a right side elevation view of the unit shown in FIG. 8.
Figure 8:
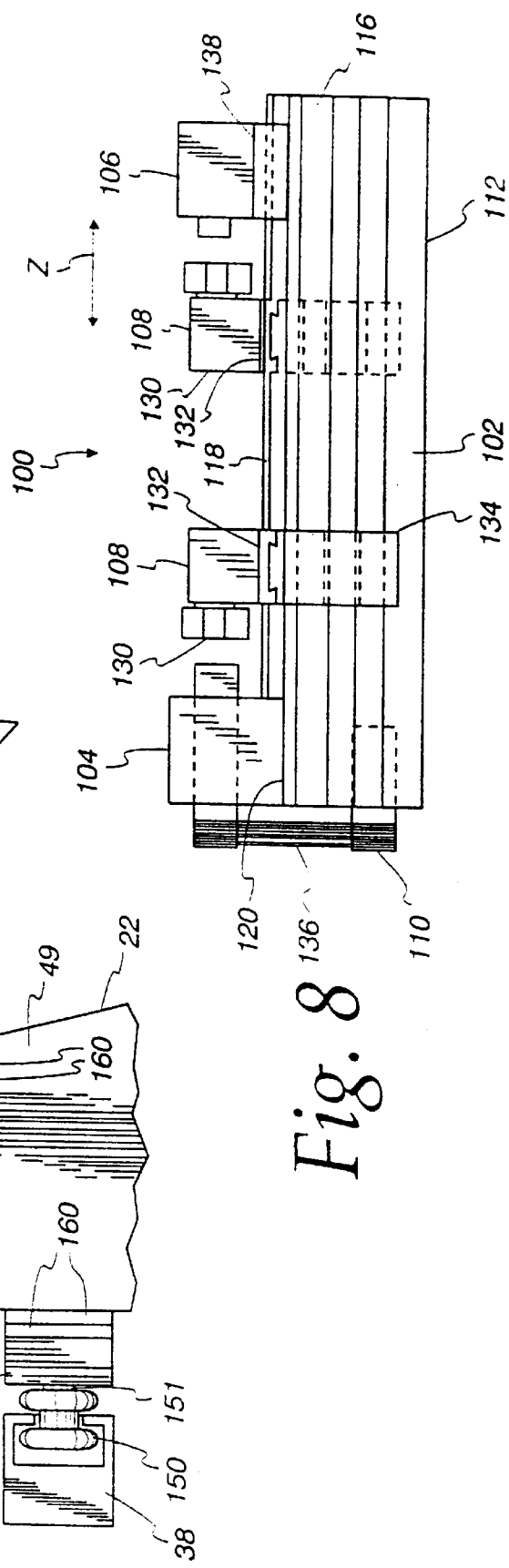
FIG. 8 is a side elevation view of a lathe processing unit.
Figure 11:
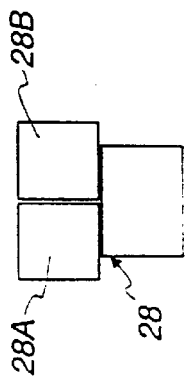
FIG. 11 is a diagrammatic view of a self-contained procuring unit of the machine tool shown in FIG. 1.

As best seen in FIGS. 8 and 9, the self-contained processing units 28 are illustrated in the form of numerically-controlled lathes 100. However, it should be appreciated that the self-contained processing units 28 may take the form of any conventional machine tool having structure 28A for holding the workpiece for processing and structure 28B for performing a process on a workpiece, as shown in FIG. 11. Such conventional machine tools include, but are not limited to, an injection molding machine, an EDM machine, an ECM machine, an EBM machine, a LBM machine, a CMM machine, a robot welding machine, a wire-cutting machine, and a laser-cutting machine. The structure 28A for holding the workpiece may include, for example, a headstock assembly, a tailstock assembly, a table slide assembly or, in the case of an injection molding machine, a die set. The structure 28B for performing a process on a workpiece may include, for example, a cutting tool holder, a cutting tool spindle, a turret slide assembly, a die injection mechanism, a welding mechanism, an electrical machining mechanism, or a laser.

Accordingly, within this application, "self-contained processing unit" generally is intended to mean a machine tool that has all the components required to hold a workpiece and to perform the processing function of the processing unit on the workpiece. Thus, for example, in FIGS. 1 and 2, the lathes 100 are self-contained processing units 28 because each lathe 100 has a headstock 104 for holding a workpiece and at least one of the turret slide assemblies 108, for performing lathe processing on the workpiece.

It should also be appreciated that a different type of processing unit 28 may be mounted on each of the mount surfaces 57 of the post 52. Thus, a lathe 100 could be mounted on one of the surfaces 57, a robot welding machine could be mounted on another of the surfaces 57, an injection molding machine could be mounted on yet another of the surfaces 57, and a laser-cutting machine could be mounted on the last surface 57. It should also be appreciated that the various types of processing units 28 can be of a conventional construction modified to mate with the mount surfaces 57 and to operate freely within the processing areas 56.

Each lathe 100 is constructed of a number of standardized components including a base or platform 102, a main spindle or head stock assembly 104, a secondary spindle or tailstock assembly 106, two turret slide assemblies 108, and a spindle drive motor 110. The headstock assembly 104, the tailstock assembly 106, the two turret slide assemblies 108, and the spindle drive motor 110 are all controlled in a conventional manner by the control unit 48.

The platform 102 is a one-piece structure that includes a mount surface 112 adapted to mate with any of the mount surfaces 57 of the post 52, a pair of longitudinally-extending side rails 114,116 that extend over the length of the platform 102, a longitudinally-extending top rail 118 that extends partially over the length of the platform 102, and a relief surface 120 that is parallel to the surface 112 and extends partially over the length of the platform 102. The platform 102 further includes a hole 121 that extends longitudinally through the platform 102. The hole 121 serves as a mount for the motor 110 and also aids in radiating heat generated by the components of the lathe.

Each of the turret slide assemblies 108 includes a conventional tool turret and drive assembly 130, a conventional cross slide assembly 132 carrying the assembly 130 for translations along an axis X and a longitudinal slide assembly 134 carrying both of the assemblies 132 and 130 for translation along an axis Z. One of the turret slide assemblies 108 is mounted to the rail 114 by its longitudinal slide assembly 134 and the other turret slide assembly 108 is mounted to the other side rail 116 by its longitudinal slide assembly 134.

The head stock 104 is mounted to the surface 120 and is driven through belts 136 by the drive motor 110, which is mounted in the hole 121. The tailstock assembly 106 includes a longitudinal slide assembly 138. The slide assembly 138 is mounted to the top rail 118 for translating the tailstock assembly 106 along the Z axis.

It should be appreciated that the components 102, 104, 106, 108 and 110 are standardized for the lathes 100 and may be interchanged therebetween. It will also be appreciated that each lathe 100 may be customized by mounting only selected components to the platform 102.

As best seen in FIG. 5, the annular carrier 38 is mounted to the base 49 for rotation about the axis 26 by a plurality of cantilevered rollers 150 that are spaced around the outer circumference for the base 49. Each of the rollers 150 is rotatably mounted by a cantilevered shaft 151 to a bracket 152 which, in turn, is fixed to the base 49.

The carrier 38 is rotatably driven and indexed by a drive, shown schematically at 153 in FIG. 1, that is essentially identical to the drive assembly 80 for the carrier 24. Accordingly, a detailed description of the drive for the carrier 38 is not required and it should be appreciated that, similar to the carrier 24, any conventional rotational drive and positional control system may be employed to drive and index the carrier 38 about the axis 26.

Vibrational dampers, in the form of strips 160 of industrial Velcro® brand fasteners or other suitable hook and loop fasteners, are provided between certain strategic joints of the machine tool to isolate each of the various components of the machine tool 20 from the vibrations created by the other components of the machine tool 20. Specifically, the Velcro® fastener strips 160 are provided at the joints between the mount surfaces 57 of the post 52 and the mount surfaces 112 of the platforms 102, the rim 50 and the upper bearing race 74, the base 49 and the lower bearing race 72, and the base 49 and each of the brackets 152. The strips 160 are attached to their associated components using a suitable adhesive and the joints are clamped together using suitable fasteners. As best seen in FIG. 7, the strips 160 are also provided between the belt 89 and the rim 50 and are held in compression by a circumferential tension force in the belt 89 created by an interference fit between the belt 89 and the outer circumference of the rim 50. In addition to damping vibrations, the Velcro® fastener strips 160 assist in reinforcing the joints between the components.

It should be appreciated that the strips 160 can be eliminated from any of the joints if it is determined that the structurally-transmitted vibrations across the joint are not a concern.

The machine tool 20 is capable of a variety of modes of operation. For example, in one mode, the machine tool is configured as shown in FIGS. 1 and 2, with each of the processing units 28 being a lathe 100 with a single turret slide assembly 108, a headstock assembly 104, and a tailstock assembly 106 mounted on a platform 102. Each of the turret slide assemblies 108 carries a complement of cutting tools capable of performing all of the required lathe operations on a workpiece of a given configuration. Four workpieces are sequentially loaded into the head stocks 104 of each of the lathes 100 as each of the lathes 100 is indexed to the workpiece transfer station 23 by rotation of the post 52 by the drive assembly 80. The processing of each workpiece is begun immediately after it is loaded into the headstock 104 and, in this manner, all of the required lathe operations for four workpieces of a given configuration may be machined substantially simultaneously by the machine tool 20. After each lathe 100 finishes processing its workpiece, the lathe 100 is indexed to the workpiece transfer station 23 and the processed workpiece is removed from the head stock 104 and an unprocessed workpiece is loaded. In this manner, the machine tool 20 can continuously process a plurality of workpieces.

In another mode, the machine tool 20 is configured as set forth above with the exception that each of the slide assemblies 108 carries a complement of tools for performing a set of processing functions different from the other slide assemblies 108. In this mode, a first workpiece is loaded into the first lathe 100 after the first lathe 100 has been indexed to the work station 23. The first lathe 100 then performs a first series of processing functions on the first workpiece. Next, the first workpiece is removed from the first lathe 100 and a second workpiece is loaded into the first lathe 100. The second lathe 100 is then indexed to the work transfer station 23 and the first workpiece is loaded into the second lathe 100, which then performs the second series of processing functions on the first workpiece substantially simultaneously with the first lathe 100 performing the first series of processing functions on the second workpiece. After the first lathe 100 finishes the first series of processing functions on the second workpiece, the first lathe 100 is indexed back to the work transfer station 23 and the second workpiece is removed from the first processing unit and a third workpiece is loaded into the first lathe 100. The second lathe 100 is then indexed back to the workpiece transfer station 23 and the first workpiece is removed and replaced with the second workpiece. The third lathe 100 is then indexed to the workpiece transfer station and the first workpiece is loaded therein and the third lathe 100 performs a third series of processing functions on the first workpiece substantially simultaneously with the second lathe 100 performing the second series of processing functions on the second workpiece and the first lathe 100 performing the first series of processing functions on the third workpiece. After the first lathe 100 finishes the first series of processing functions on the third workpiece, the lathe 100 is indexed to the workpiece transfer station 23 and the third workpiece is removed therefrom and replaced with a fourth workpiece. The second lathe 100 is then indexed to the workpiece transfer station 23 and the second workpiece is removed therefrom and replaced with the third workpiece. The third lathe 100 is then indexed to the workpiece transfer station and the first workpiece is removed therefrom and replaced with the second workpiece. The fourth lathe 100 is then indexed to the workpiece transfer station and the first workpiece is loaded into the fourth lathe 100. The fourth lathe 100 then performs the fourth series of processing functions on the first workpiece substantially simultaneously with the third lathe 100 performing the third series of processing functions on the second workpiece, the second lathe 100 performing the second series of processing functions on the third workpiece, and the first lathe 100 performing the first series of processing functions on the fourth workpiece. After the first lathe 100 finishes the first series of processing functions on the fourth workpiece, the first lathe 100 is indexed to the workpiece transfer station 23 and the fourth workpiece is removed therefrom and a fifth workpiece is loaded into the lathe 100. Next, the second lathe 100 is indexed to the workpiece transfer station 23 and the third workpiece is removed therefrom and replaced by the fourth workpiece. The third lathe 100 is then indexed to the workpiece transfer station 23 and the second workpiece is removed therefrom and replaced by the third workpiece. The fourth lathe is then indexed to the workpiece transfer station 23 and the first workpiece is removed therefrom and replaced by the second workpiece. The first workpiece is now finished and removed from the machine tool 20, while the fourth lathe performs the fourth series of process functions on the second workpiece, the third lathe 100 performs the third series of process functions on the third workpiece, the second lathe 100 performs the second series of processing functions on the fourth workpiece, and the first lathe 100 performs the first series of processing functions on the fifth workpiece. In this manner, the machine tool 20 can continuously manufacture a plurality of workpieces requiring first, second, third and fourth series of processing functions. It should be appreciated that in this mode each of the lathes 100 may begin its series of processing functions on a workpiece as soon as the workpiece is loaded into the lathe 100.

It should be appreciated that the workpieces can be transferred to and from the processing units either manually or by using the workpiece/cutting tool transfer device 40.

As seen in FIG. 2, if increased flexibility for the machine tool 20 is desired, additional workpiece transfer stations 23 can be added to allow for the simultaneous transfer of workpieces to and from a plurality of the processing units 28. Flexibility can be further increased by adding additional workpiece transfer devices 40 onto the carrier 38.

Figure 12:
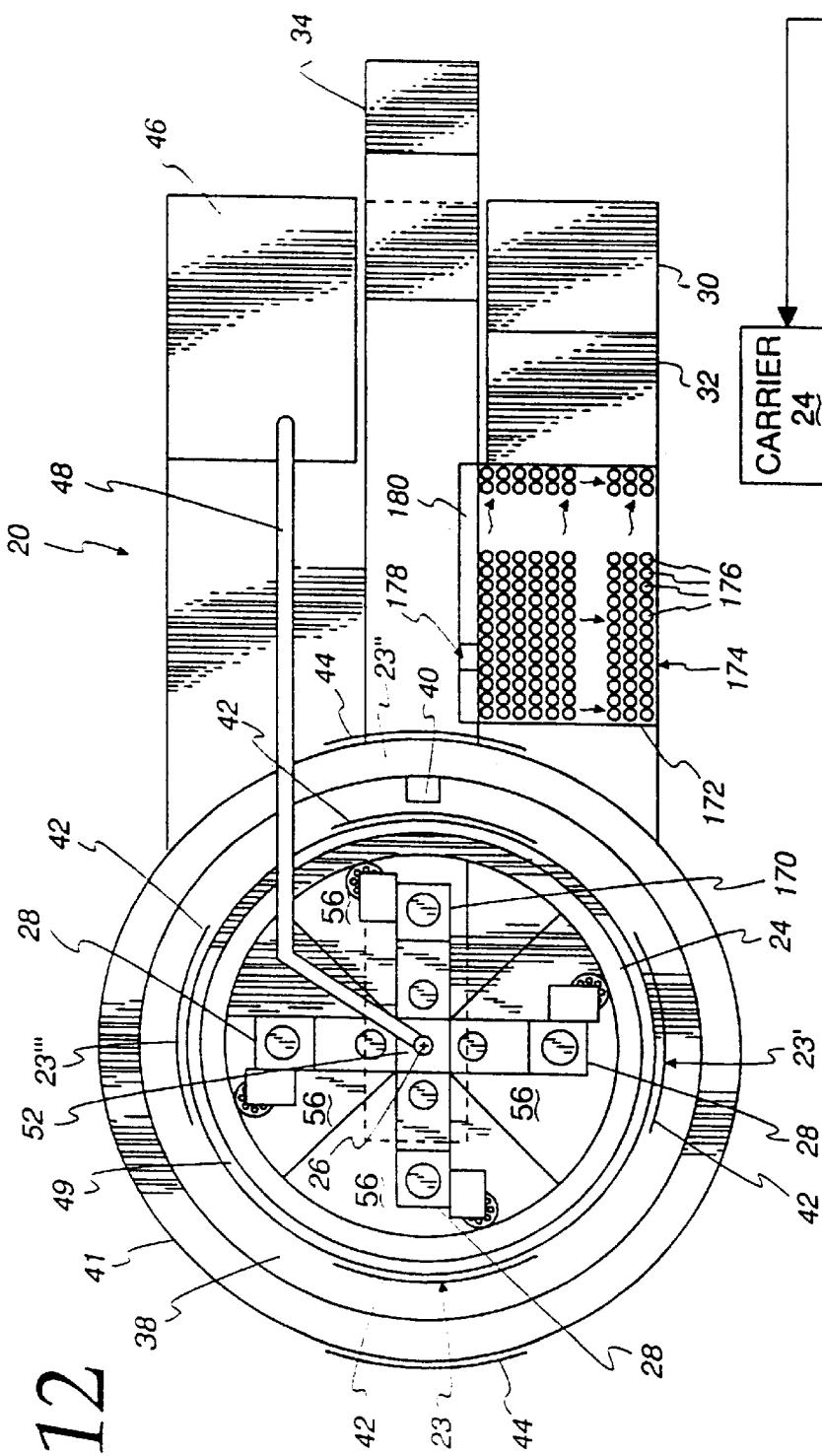
FIG. 12 is a diagrammatic plan view of another machining system embodying the present invention.
Figure 13:
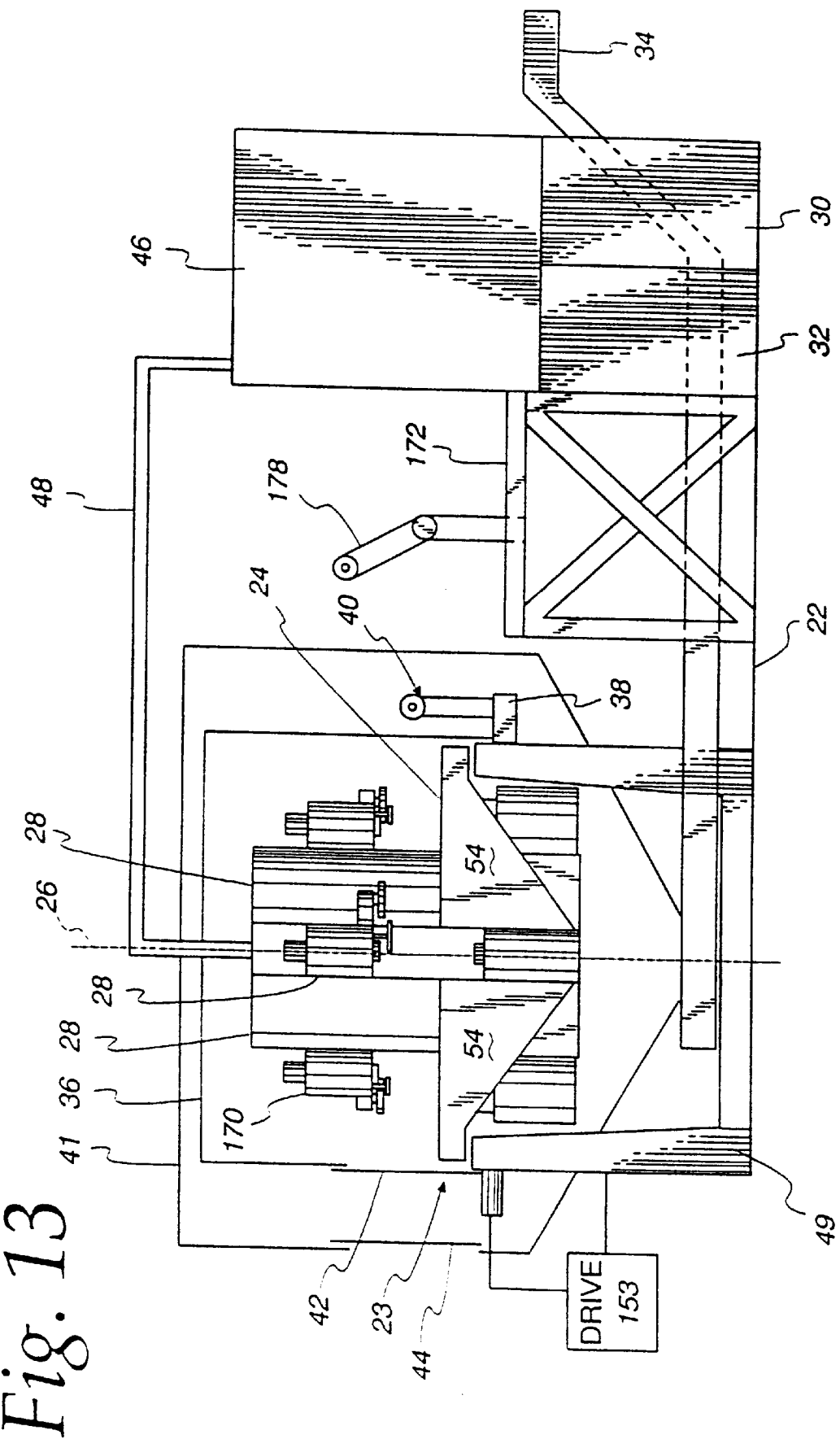
FIG. 13 is a diagrammatic elevation view shown partially in section of the machining system shown in FIG. 13.

FIGS. 12 and 13 show the machine tool 20 in yet another configuration, with each of the processing units 28 being a machining center 170, rather than a lathe 100. In this configuration, the machine tool 20 also includes a shared cutting tool storage device or stocker 172 for storing a plurality of cutting tools to be used in the processing units 28. The shared tool stocker 172 is mounted to the frame 22 and includes a matrix 174 of tool storage positions 176, as best seen in FIG. 12. Each storage position 176 is adapted to store a cutting tool. The machine tool 20 also includes a robotic arm, cutting tool transfer device 178 mounted for linear movement along a rail 180, as best seen in FIG. 12, fixed to the tool stocker 172. Additionally, as best seen in FIG. 12, the machine tool 20 includes four transfer stations 23,23',23", 23''', each having automatic doors 42,44.

It should be understood that the tool stocker 172 and the transfer device 178 may be of any suitable and known construction. In one preferred embodiment, the matrix 174 would have approximately 200 storage positions 176.

As best seen in FIGS. 14–16, each of the machining centers 170 is constructed of a number of standardized components that are attached to one of the platforms 102. The standardized components include a workpiece table assembly 182 that is fixed to the top rail 118, a cutting tool drive spindle assembly 184 that is mounted to the top rail 118 for translation along the top rail 118, a dedicated cutting tool storing device 186 for storing a plurality of cutting tools to be used in the machining center 170, and a dedicated cutting tool transfer device 188 for transferring cutting tools between the tool storing device 186 and the spindle assembly 184.

The table assembly 182 includes X and Y slide assemblies 190 and 192 for translating a workpiece along respective X and Y axes relative to a cutting tool driven by the spindle assembly 184.

The spindle assembly 184 includes a cutting tool spindle 193 for holding a cutting tool as it is rotatably driven by the spindle assembly 184. The spindle 193 is mounted in the assembly 184 for translation along a Z axis.

The tool storing device 186 includes a tool storage matrix 194 having a plurality of cutting tool storage positions 196. The tool storing device 186 further includes a drive 198 for indexing the matrix 194 relative to a tool transfer location 200, as indicated by the arrow B.

The transfer device 188 includes a first tool carrier 202 for carrying a cutting tool between the spindle 193 and the matrix 194, and a second tool carrier 204 for carrying a tool between the tool spindle 193 and the matrix 194. As best seen in FIG. 16, a drive 206 is provided in the spindle assembly 184 for indexing the first and second tool carriers 202,204 relative to the tool spindle 185 and the tool transfer location 200, as indicated by the arrows C.

The workpiece table assembly 182, the cutting tool drive spindle assembly 184, the storing device 186, and the transfer device 188 are either conventional or are constructed utilizing conventional components and, accordingly, need not be described in further detail for an understanding of the invention.

The configuration of the machine tool 20 shown in FIGS. 12,13 operates in the same manner as previously described in connection with the configuration shown in FIGS. 1,2. Additionally, the configuration of the machine tool 20 shown in FIGS. 12,13 allows for the machine tool 20 to be retooled while maintaining continuous operation of the machine tool 20. More specifically, in operation, an inventory of cutting tools is stored in the shared tool stocker 172 for shared use in the processing units 28. Additionally, a plurality of cutting tools are stored in the dedicated tool storing devices 194 on the processing units 28. When it is desired to replace one of the cutting tools in a tool storing device 194 on one of the processing units 28, the processing unit 28 and the workpiece/cutting tool transfer device 40 are indexed to one of the transfer stations 23,23',23",23'''. The automatic door 42 is opened and the workpiece/cutting tool transfer device reaches into the processing area 56 and removes a cutting tool from the matrix 194. If the workpiece/cutting tool transfer device 40 is not at the transfer position 23", the transfer device 40 is indexed to the transfer position 23' and the automatic door 44 is open. The transfer devices 40 and 178 then cooperate to transfer the cutting tool from the transfer device 40 to the transfer device 178. The transfer device 178 then places the cutting tool in an empty storage position 176 of the matrix 174, translating along the rail 180 if required. While the transfer device 178 is placing the cutting tool into a storage position 176, the transfer device 40 may be removing another cutting tool from another one of the processing units 28 according to the method as previously described.

When it is desired to transfer a cutting tool from the tool stocker 172 to one of the processing units 28, the transfer device 178 is translated along the rail 180 to adjacent one of the storage positions 176 and removes a cutting tool from the storage position 176. The transfer device 178 then translates along the rail 180 to adjacent the transfer position 23. The automatic door 44 is opened and the transfer devices 178 and 40 cooperate to transfer the cutting tool from the transfer device 178 to the transfer device 40. The processing unit 28 and the transfer device 40 are then indexed to one of the transfer stations 23,23',23",23''', and the automatic door 42 is opened. The transfer device 40 then reaches into the processing area 56 and places the cutting tool into the matrix 194 of the processing unit. While the transfer device 40 is indexing to the appropriate transfer station 23,23',23",23''', and transferring the cutting tool to the appropriate matrix 194, the transfer device 178 may remove another cutting tool from a storage position 176 in the matrix 174.

It should be appreciated that if a processing unit 28 is already at the desired transfer station 23,23',23",22''', only the transfer device 40 will be indexed. Similarly, if the transfer device 40 is already at the desired transfer station 23,23',23", 23''', only the processing unit 28 must be indexed. If both the transfer device 40 and the processing unit 28 are at the desired transfer station 23,23',23",23''', no indexing is required.

While the transfer devices 40, 178 are transferring a cutting tool between a processing unit 28 and the shared tool stocker 172, the dedicated transfer device 188 may be transferring cutting tools between the matrix 194 and the tool spindle 193. In this operation, one of the tool carriers 202, 204 removes a cutting tool from the matrix 194 while the other tool carrier 202, 204 removes a cutting tool from the tool spindle 193. The transfer device 188 is then indexed 180° as indicated by the arrows C so that the cutting tool from the matrix 194 is aligned with the tool spindle 193 and the cutting tool from the tool spindle 193 is aligned with the transfer position 200. The tool carriers 202,204 then place their respective cutting tools into the matrix 194 and the tool spindle 184.

It should be appreciated that the invention contemplates that more or less than four processing units 28 may be configured on the machine tool 20. Thus, for example, the carrier 24 may be configured with only two processing areas 56 and two mount surfaces 57 on the post 52. By way of further example, a carrier 24 may be configured with eight processing areas 56 and eight mount surfaces 57 on the post 52 to accommodate eight processing units 28.

It will be appreciated that by mounting a plurality of self-contained processing units on a single frame so that the processing units can be sequentially indexed to a workpiece transfer station for workpiece loading and unloading, the machine tool 20 can provide the benefits of a conventional transfer machine without requiring the floor space of a conventional transfer machine, the additional cost of dedicated bases for each processing unit, or a complex workpiece transfer device.

It should also be appreciated that by providing a shared tool stocker 172 that stores tools for all of the processing units 28 of the machine tool 20, the size of the dedicated tool storing devices 186 associated with each processing unit 28 may be made smaller than the dedicated tool stockers used on conventional transfer machines.

It should also be appreciated that an operator may replace cutting tools stored in the tool stocker 172 while the machine tool 20 is operating, thereby allowing for continuous operation of the machine tool 20.

What is claimed is:

1. A system for machining workpieces, said machining system comprising:

a first workpiece processing unit;

a second workpiece processing unit;

means for storing a plurality of cutting tools to be used in said first and second processing units;

first transfer means for selectively transferring cutting tools between the storing means and each of the first and second processing units, said first transfer means comprising a) second transfer means for transferring cutting tools to and from said first and second processing units, said second transfer means comprising a carriage mounted on the frame for movement between a first location on said frame to effect transfer of cutting tools to and from said first processing unit and a second location on said frame to effect transfer of cutting tools to and from said second processing unit, said first location being spaced from said second location, said carriage comprising a ring-shaped carrier mounted on said frame for rotation about an axis; and b) third transfer means for transferring cutting tools between said storing means and said second transfer means.

2. A system for machining workpieces, said system comprising:

a frame;

a first tool spindle mounted on the frame;

first means for storing a plurality of cutting tools to be used in said first tool spindle;

second means for storing a plurality of cutting tools to be used in said first tool spindle;

first transfer means for transferring cutting tools between said second storing means and said first storing means; and second transfer means for transferring cutting tools between said first tool spindle and said second storing means;

a second tool spindle mounted on the frame;

third means for storing a plurality of cutting tools to be used in said second tool spindle;

third transfer means for transferring cutting tools between said second tool spindle and said third storing means; and wherein said first storing means comprises means for storing a plurality of cutting tools to be used in said second tool spindle, and said first transfer means comprises means for transferring cutting tools between said third storing means and said first storing means.

3. A method of tooling an automated machining system, said method comprising the steps of:

a) providing a first processing unit;

b) providing a second processing unit;

c) providing a storing device for storing a plurality of tools to be used in the first and second processing units;

d) providing a first transfer device for transferring tools to and from the first and second processing units;

e) providing a second transfer device for transferring tools between the storage device and the first transfer device;

f) transferring a first tool from the storage device to the first transfer device using the second transfer device;

g) transferring the first tool to one of the first and second processing units using the first transfer device; and h) transferring a second tool from the storage device using the second transfer device.

4. The method of claim 3 wherein steps g and h are performed substantially simultaneously.

5. The method of claim 3 wherein step g includes repositioning the first transfer device relative to the one of the first and second processing units.

6. A system for machining workpieces, said machining system comprising:

a frame;

a first self-contained processing unit mounted on the frame for movement between a first location on said frame and a second location on said frame spaced from said first location;

a second self-contained processing unit mounted on said frame for movement between said first and second locations;

a shared tool stocker comprising a matrix of tool storage positions to store a plurality of cutting tools for use in said first and second processing units; and a cutting tool transfer device mounted on the frame to transfer cutting tools between the shared tool stocker and said first and second processing units at least at one of said first and second locations on said frame.

7. The machining system of claim 6 wherein said first and second locations are spaced circumferentially about an axis, and said first and second processing units are mounted on said frame for rotation about the axis between said first and second locations.

8. The machining system of claim 6 further comprising a machining debris shield that is mounted on said frame and surrounds said first and second processing units, a first automated opening and closing door in said shield at said first location to allow transfer of cutting tools through the shield, and a second automated opening and closing door at said second location to allow transfer of cutting tools through the shield.

9. The machining system of claim 6 wherein said cutting tool transfer device is mounted on said shared tool stocker.

10. The machining system of claim 6 wherein said first workpiece processing unit comprises a dedicated tool stocker to store a plurality of cutting tools to be used in said first workpiece processing unit.

11. The machining system of claim 10 wherein said first processing unit further comprises a tool spindle, and a dedicated transfer device to transfer cutting tools between the tool spindle and the dedicated tool stocker.

12. The machining system of claim 6 wherein said cutting tool transfer device comprises a carriage mounted on the frame for movement between said first and second locations.

13. The machining system of claim 12 wherein said cutting tool transfer device further comprises a cutting tool transfer device mounted on the frame to transfer cutting tools between the shared tool stocker and the carriage.

14. The machining system of claim 12 wherein said carriage comprises a ring-shaped carrier mounted on the frame for rotation about an axis.

15. A system for machining workpieces, said machining system comprising:
- a first self-contained processing unit including a first dedicated tool stocker;
- a second self-contained processing unit including a second dedicated tool stocker;
- a shared cutting tool stocker to store a plurality of cutting tools for use in the first and second processing units;
- a first cutting tool transfer device to remove cutting tools from the shared tool stocker; and
- a second cutting tool transfer device mounted on a frame for movement between a first position wherein cutting tools from the shared tool stocker are transferred to the second transfer device by the first transfer device, and a second position wherein the second transfer device transfers cutting tools to and from the first and second dedicated tool stockers.

16. A method of tooling an automated machining system, said method comprising the steps of:
- removing a first tool from a shared tool stocker using a first transfer device;
- transferring the first tool from the first transfer device to a second transfer device;
- transferring the first tool to a first dedicated tool stocker on a first self-contained processing unit using the second transfer device;
- removing a second tool from the shared tool stocker using the first transfer device;
- transferring the second tool from the first transfer device to the second transfer device; and
- transferring the second tool from the second transfer device to a second dedicated storage tool stocker on a second self-contained processing unit.

* * * * *